United States Patent [19]

Ishikawa et al.

[11] Patent Number: 5,424,874
[45] Date of Patent: Jun. 13, 1995

[54] MECHANISM FOR FITTING LENS TO AN EXTENSION

[75] Inventors: Takeshi Ishikawa, Tokyo; Satoshi Nagasawa, Higashi-kurume, both of Japan

[73] Assignee: Stanley Electric Co., Ltd., Tokyo, Japan

[21] Appl. No.: 117,721

[22] Filed: Sep. 7, 1993

[30] Foreign Application Priority Data

Sep. 10, 1992 [JP] Japan .................................. 4-069758

[51] Int. Cl.⁶ .............................................. G02B 7/02
[52] U.S. Cl. .................................. 359/819; 362/83.1; 362/311; 362/310
[58] Field of Search ...................... 362/83.1, 311, 310; 359/819, 827, 828; 403/335

[56] References Cited

U.S. PATENT DOCUMENTS

| | | | |
|---|---|---|---|
| 4,831,502 | 5/1989 | Fujino et al. | 362/310 |
| 5,013,179 | 5/1991 | Rothmund | 403/335 |

Primary Examiner—Scott J. Sugarman
Assistant Examiner—Thomas Robbins
Attorney, Agent, or Firm—Frishauf, Holtz, Goodman & Woodward

[57] ABSTRACT

A lighting device for a vehicle includes a mechanism for preliminarily fitting a lens to an extension before it is firmly fitted to a housing of the lighting device. To assure that a lens fitting operation is easily achieved at a reduced cost, a fitting hole is formed through an auxiliary foot portion extending from a housing fitting foot portion of the lens. A boss in the form of a tapered pin-shaped projection extends from the extension at the position corresponding to that of the fitting hole. In addition, a flange portion is formed at the upper end of the extension. The lens fitting operation is performed by inserting the boss into the fitting hole while the flange portion is placed on the upper surface of one of the side walls defining a lens receiving groove formed at the upper end of the housing of the lighting device. In the case that there is no possibility that water invades in the interior of a lighting chamber of the lighting device, the fitting hole may be formed directly through the housing fitting foot portion.

19 Claims, 1 Drawing Sheet

MECHANISM FOR FITTING LENS TO AN EXTENSION

BACKGROUND OF THE INVENTION

1. Field of the Invention

The present invention relates generally to a lighting device for a vehicle. More particularly, the present invention relates to an improvement of a mechanism disposed in a lighting device of the foregoing type for preliminarily fitting a lens to an extension before an assembly of the lens and the extension is firmly fitted to a housing of a lighting device, and wherein the extension is disposed in the lighting device for the purpose of covering a part of the lighting device unnecessary to be visually seen by anybody.

2. Background Art

To facilitate understanding of the present invention, a typical conventional mechanism of the foregoing type will briefly be described below with reference to FIG. 2. With the conventional mechanism, since the direction of fitting a lens 91 to an extension 92 largely differs from the direction of the lens 91 to a housing 93 of a lighting device (not shown), it is practically impossible to fit the lens 91 to the extension 92 after the extension 92 latter is preliminarily fitted to the housing 93. For this reason, the lens 91 is first fitted to the extension 92 to form an assembly and, thereafter, the assembly of the lens 91 and the extension 92 is fitted to the housing 93.

To assure that the lens 91 is reliably fitted to the extension 92, a part of the lens 91 is extended from a housing fitting foot portion 91a to form an auxiliary foot portion 91b so that the lens 91 is firmly secured to the extension 92 by fixing the auxiliary foot portion 91b to the extension 92 at plural locations by tightening a plurality of screws as shown in FIG. 2.

With the conventional mechanism constructed in the above-described manner, since there arises a necessity for fixing the auxiliary foot portion 91b to the housing fitting foot portion 91a with the aid of a plurality of screws before an assembly of the lens 91 and the extension 92 is firmly fitted to the housing 93 of the lighting device, a lens fitting operation is achieved in a complicated manner with an increased number of steps, resulting in the lighting device being produced at an increased cost.

SUMMARY OF THE INVENTION

The present invention has been made in consideration of the aforementioned background.

An object of the present invention is to provide a mechanism for preliminarily fitting a lens to an extension to form an assembly, before the assembly of the lens and the extension is firmly fitted to a housing of a lighting device for a vehicle, and wherein a lens fitting operation can easily be achieved at a reduced cost without a necessity for tightening any screws or the like.

The present invention provides a mechanism for preliminarily fitting a lens to an extension before an assembly of the lens and the extension is firmly fitted to a housing of a lighting device for a vehicle, wherein the mechanism includes at least one fitting hole formed through an auxiliary foot portion extending from a housing fitting foot portion of the lens, and a boss in the form of a tapered pin-shaped projection extended from the extension, the boss being located at a position corresponding to that of the fitting hole through which the boss is inserted.

In addition, the mechanism includes a flange portion which extends from the upper end of the extension to be held between the lens and the housing in a clamped state when the assembly of the lens and the extension is fixed to the housing.

In practice, a lens fitting operation is performed by inserting the boss into the fitting hole while the flange portion is placed on the upper surface of one of the side walls defining a lens receiving groove formed at the upper end of the housing of the lighting device.

In a case where there is no possibility that water such as rain water or the like can enter into the interior of a lighting chamber of the lighting device, the fitting hole may be formed directly through the housing fitting foot portion.

Other objects, features and advantages of the present invention will become apparent from a reading of the following description which has been made in conjunction with the accompanying drawing.

DETAILED DESCRIPTION OF THE PREFERRED EMBODIMENTS

Figure 1:
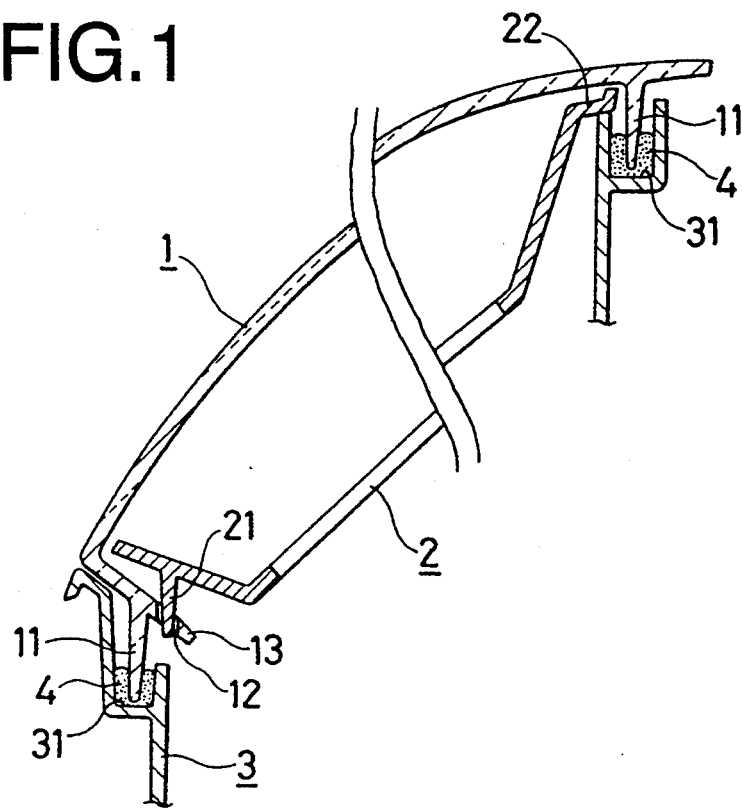
FIG. 1 is a fragmentary sectional view of a mechanism for preliminarily fitting a lens to an extension before an assembly of the lens and the extension is firmly fitted to a housing of a lighting device according to an embodiment of the present invention.
Figure 2:
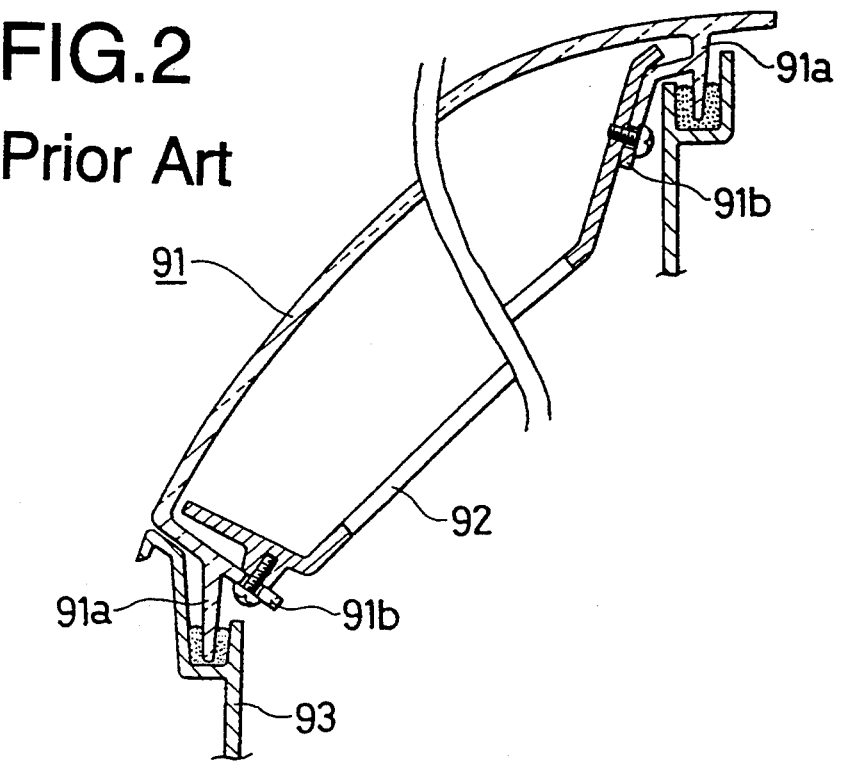
FIG. 2 is a fragmentary sectional view of a conventional mechanism of the foregoing type.

In FIG. 1, reference numeral 1 designates a lens and reference numeral 2 designates an extension. Similar to the conventional mechanism described above with reference to FIG. 2, the lens 1 is preliminarily fitted to the extension 2 before an assembly of the lens 1 and the extension 2 is fitted to a housing 3 of a lighting device (not shown) for a vehicle. A characterizing feature of the mechanism of the present invention is that a housing fitting foot portion 11 of the lens 1 includes an auxiliary foot portion 13 through which at least one fitting hole 12 is formed. As seen in FIG. 1, the housing fitting foot portion 11 extends from the main light-passing portion of the lens 1, and the auxiliary foot portion 13 and its fitting hole 12 are formed more interiorly of the housing 3 of the lighting device.

In addition, the extension 2 includes a boss 21 in the form of a tapered pin-shaped projection at the position corresponding to that of the fitting hole 12. While the boss 21 is inserted into the fitting hole 12, the lens 1 can be attached to and detached from the extension 2 as desired. The reason why the lens 1 includes the above described auxiliary foot portion 13 is that if a fitting hole 12 is formed directly on the housing fitting foot portion 11, there arises a problem that water such as rain water or the like could enter into interior of the lighting chamber of the lighting device through the fitting hole 12. Therefore, when there is no possibility that water invasion occurs, the fitting hole 12 may be formed directly on the housing fitting foot portion 11.

In addition, the extension 2 includes a flange portion 22 in the region along the upper portion of the periphery thereof, i.e., at the upper part thereof in the embodiment of FIG. 1.

In practice, a lens fitting operation is performed in the following manner.

First, the lens 1 is preliminarily fitted to the extension 2 to form an assembly, and thereafter, the housing fitting foot portion 11 is received in a lens receiving groove 31 of the housing 3, so that the foot portion 11 is firmly held in the lens receiving groove 31 using a thermoplastic adhesive 4. On completion of the lens fitting operation, the flange 22 is held between the inner surface of the lens 1 and the upper surface of one of the side walls defining the lens receiving groove 31 in a clamped state, whereby the lens 1 is firmly secured to the housing 3 of the lighting device with the aid of the flange portion 22 in cooperation with the boss 21 fitted into the fitting hole 12.

While the present invention has been described above with respect to a single preferred embodiment thereof, it should of course be understood that the present invention should not be limited only to this embodiment but various change or modification may be made without any departure from the scope of the present invention as defined by the appended claims.

What is claimed is:

1. In a mechanism for preliminarily fitting a lens (1) to an extension (2) before an assembly of said lens and said extension is firmly fitted to a housing (3) of a lighting device for a vehicle, the improvement wherein:
    said lens comprises:
        a main light-passing portion (1);
        a housing fitting foot portion (11) extending from said main portion (1);
        an auxiliary foot portion (13) extending from said housing fitting foot portion (11) and surrounding at least a portion of the extension (2); and
        at least one fitting hole (12) formed through said auxiliary foot portion (13); and
    said extension comprises:
        a boss (21) in the form of a tapered pin-shaped projection extending laterally from said extension, said boss (21) being located at a position corresponding to the position of said at least one fitting hole (12), and said boss (21) being inserted through said at least one fitting hole (12) during said preliminary fitting of said lens (1) to said extension (2) to retain said lens (1) on said extension (2) to form said assembly which is thereafter fittable as a unit to the housing (3) of a lighting device for a vehicle.

2. The mechanism according to claim 1, wherein said boss (21) extends from a lower end portion of said extension.

3. The mechanism according to claim 2, wherein said extension further comprises a flange portion (22) extending from an upper end portion of said extension, said flange portion (22) being arranged to be held between said lens (1) and said housing (3) in a state where said assembly of said lens (1) and said extension (2) is firmly fitted to said housing.

4. The mechanism according to claim 1, wherein said extension further comprises a flange portion (22) extending from an upper end portion of said extension, said flange portion (22) being arranged to be held between said lens (1) and said housing (3) in a state where said assembly of said lens (1) and said extension (2) is firmly fitted to said housing.

5. The mechanism according to claim 4, wherein:
    said housing (3) has a lens receiving groove (31) at an upper end portion of the housing, said lens receiving groove (31) being defined between spaced apart side wall portions of said housing; and wherein
    said boss (21) is inserted into said at least one fitting hole (12) while said flange portion (22) is on an upper surface of one of said side walls defining said lens receiving groove (31) at the upper end portion of said housing.

6. The mechanism according to claim 5, wherein said housing fitting portion (11) is received in said lens receiving groove (31) of said housing (3) and is sealed in said lens receiving groove (31) to protect said auxiliary foot portion (13) and said at least one fitting hole (12) from outside contamination.

7. The mechanism according to claim 6, wherein said auxiliary foot portion (13) and said at least one fitting hole (12) therein are more interior of said housing (3) than said housing fitting foot portion (11).

8. The mechanism according to claim 1, wherein said auxiliary foot portion (13) extends from said housing fitting foot portion (11) toward the interior of said lighting device.

9. The mechanism according to claim 8, wherein said housing fitting portion (11) is received in a lens receiving groove (31) of said housing (3) and is sealed in said lens receiving groove (31) to protect said auxiliary foot portion (13) and said at least one fitting hole (12) from outside contamination.

10. The mechanism according to claim 1, wherein said auxiliary foot portion (13) and said at least one fitting hole (12) therein are more interior of said housing (3) than said housing fitting foot portion (11).

11. In a mechanism for preliminarily fitting a lens (1) to an extension (2) before an assembly of said lens and said extension is firmly fitted to a housing (3) of a lighting device for a vehicle, the improvement wherein:
    said lens comprises:
        a main light-passing portion (1); and
        connecting means including a housing fitting foot portion (11) extending from said main portion (1), and at least one fitting hole (12) formed in a part of said connecting means which surrounds at least a portion of the extension (2); and
    said extension comprises:
        a boss (21) in the form of a tapered pin-shaped projection extending laterally from said extension, said boss (21) being located at a position corresponding to the position of said at least one fitting hole (12), and said boss being inserted through said at least one fitting hole (12) during said preliminary fitting of said lens (1) to said extension (2) to retain said lens (1) on said extension (2) to form said assembly which is thereafter fittable to the housing (3) of a lighting device for a vehicle.

12. The mechanism according to claim 11, wherein said boss (21) extends from a lower end portion of said extension.

13. The mechanism according to claim 12 wherein said extension further comprises a flange portion (22) extending from an upper end portion of said extension, said flange portion (22) being arranged to be held between said lens (1) and said housing (3) in a state where said assembly of said lens (1) and said extension (2) is firmly fitted to said housing.

14. The mechanism according to claim 11, wherein said extension further comprises a flange portion (22) extending from an upper end portion of said extension, said flange portion (22) being arranged to be held between said lens (1) and said housing (3) in a state where said assembly of said lens (1) and said extension (2) is firmly fitted to said housing.

15. The mechanism according to claim 14, wherein:
said housing (3) has a lens receiving groove (31) at an upper end portion of the housing, said lens receiving groove (31) being defined between spaced apart side wall portions of said housing; and wherein
said boss (21) is inserted into said at least one fitting hole (12) while said flange portion (22) is on an upper surface of one of said side walls defining said lens receiving groove (31) at the upper end portion of said housing.

16. The mechanism according to claim 15, wherein said housing fitting portion (11) is received in said lens receiving groove (31) of said housing (3) and is sealed in said lens receiving groove (31) to protect said at least one fitting hole (12) from outside contamination.

17. The mechanism according to claim 16, wherein said at least one fitting hole (12) is arranged more toward the interior of said lighting device relative to said housing fitting foot portion (11).

18. The mechanism according to claim 11, wherein said housing fitting portion (11) is received in a lens receiving groove (31) of said housing (3) and is sealed in said lens receiving groove (31) to protect said at least one fitting hole from outside contamination.

19. The mechanism according to claim 11, wherein said at least one fitting hole (12) is arranged more toward the interior of said lighting device relative to said housing fitting foot portion (11).

* * * * *